Patented Feb. 5, 1929.

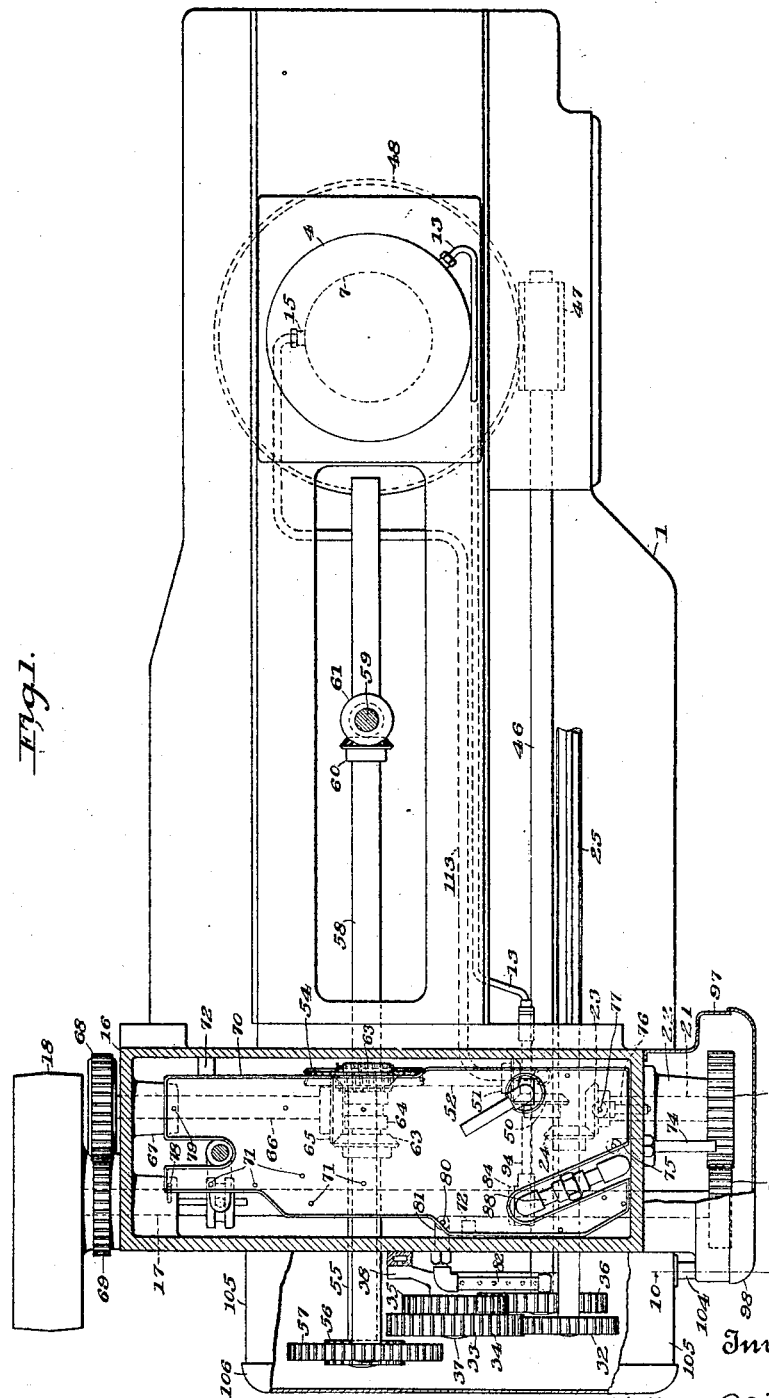

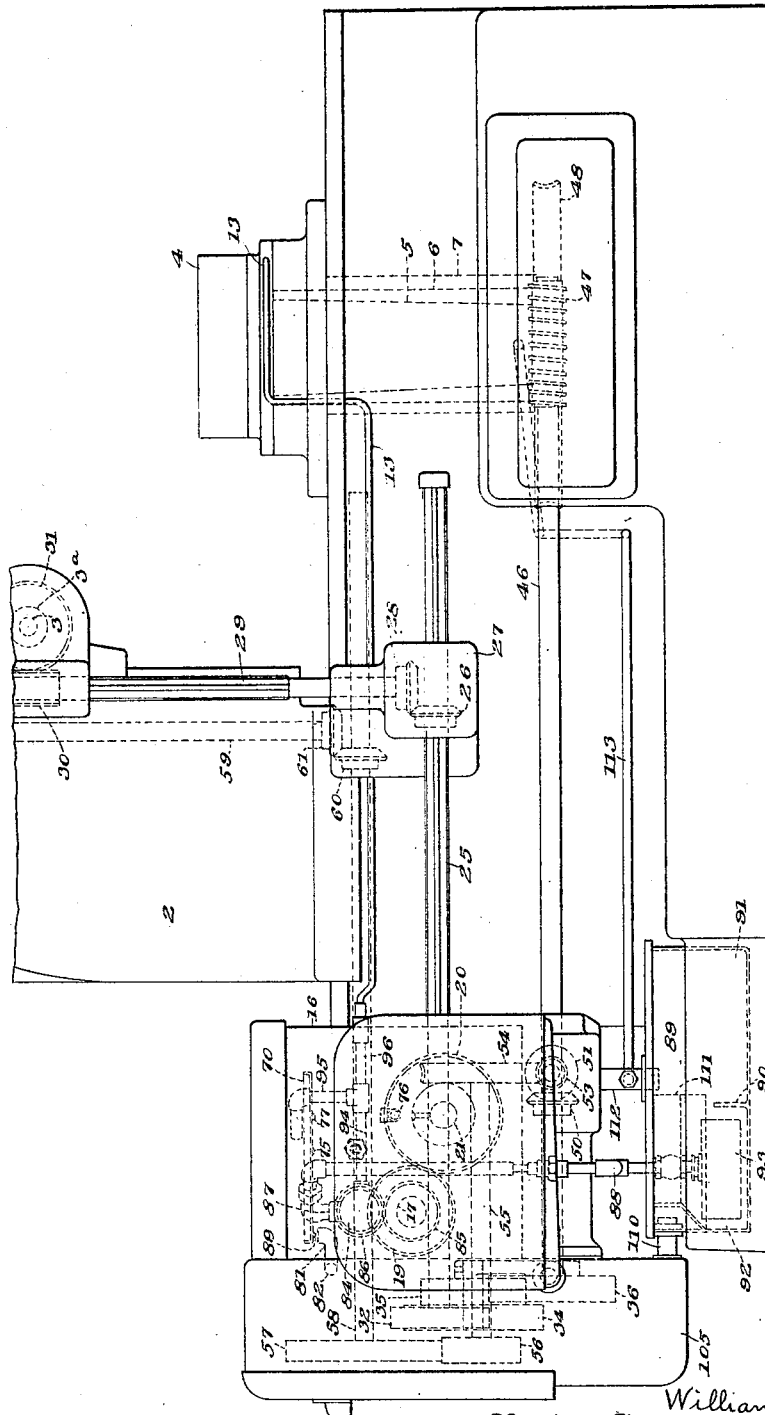

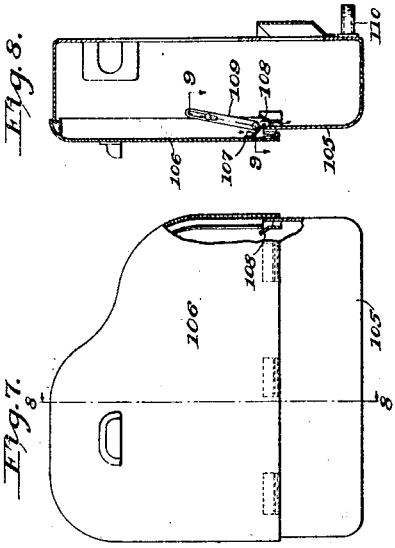

1,701,091

UNITED STATES PATENT OFFICE.

WILLIAM F. ZIMMERMANN, OF MAPLEWOOD, AND HUGO W. JACOBSON, OF ARLINGTON, NEW JERSEY, ASSIGNORS TO GOULD & EBERHARDT, OF NEWARK, NEW JERSEY, A CORPORATION OF NEW JERSEY.

LUBRICATING SYSTEM FOR HOBBING MACHINES.

Application filed June 27, 1925. Serial No. 40,014.

Our invention is concerned with a lubricating system for supplying lubricant to various gear wheels and bearings of a machine or a machine tool and is particularly concerned with a lubricating system for a hobbing machine.

In machines and machine tools it is very desirable to have many of the bearings and gear wheels supplied automatically with lubricant and not to have such parts depend on the will of the operator for receiving lubricant. Moreover in an automatic system, it is desirable to have lubricant supplied to the gear wheels and bearings only when the machine is in operation and to have each bearing and gear wheel or wheels supplied with lubricant in accordance with the lubricant required. Furthermore in an automatic lubricating system, it is desirable to prevent loss of lubricant and to use the same lubricant repeatedly in the system.

Our invention has been illustrated by means of a gear hobbing machine and in some respects is particularly adapted for lubricating many parts on such a machine. However many features of our invention are applicable to many other types of machines other than hobbing machines. In a gear hobbing machine, a hob or cutter spindle is rotated adjacent to a rotatable work carrying spindle. A main source of power or power shaft is provided for operating the hob spindle and the work carrying spindle in timed relation to each other. A set of speed change gears are provided for connecting the hob spindle to the power shaft and a set of index change gears are provided for connecting the work carrying spindle to the power shaft. Feed change gears are provided for controlling the feeding movements of the hob. Moreover it is customary to provide gear wheels for controlling the rapid traverse movements of the hob towards and away from the work on the work carrying spindle.

One of the important features of our invention is to provide a lubricating system that shall automatically supply lubricant to the cutter speed change gears, to the work indexing change gears, to the bearing for the work carrying spindle, and to other auxiliary gear wheels and bearings. Moreover the lubricant is so supplied to the various change gears in a system constructed in accordance with our invention as to in no way interfere with their accessibility for replacement or change. Furthermore, means is provided for saving and repeatedly using the same lubricating material and means is also provided for insuring against loss of any lubricating material during the changing of any of the gear wheels.

In a lubricating system constructed in accordance with our invention, a casing is provided which supports most of the gear wheels and bearings of the machine to be automatically lubricated. The cutter speed change gears are supported on the outside of the casing and are surrounded by a lubricant guard which is secured to the casing. The guard is constructed to prevent any loss of the lubricating material and is provided with a door to permit access to the cutter change gears. The door is so constructed as to insure against loss of lubricant whether the door is open or closed. The change gears for indexing the work spindle and the feed change gears are adjacently mounted on the outside of the above mentioned casing. A second lubricating guard is provided for enclosing the two sets of change gears and a door is mounted on the guard to permit access to the change gears. The door on the second guard member is constructed to prevent loss of the lubricant which is supplied to the change gears. Other gear wheels, such as the gear wheels for controlling the traverse movements of the hob, are mounted in the casing. The gear wheels, which are mounted in the casing, do not need to be positioned so that access may be readily had to them as in the case of the change gears mounted on the outside of the casing.

In a lubricating system constructed in accordance with our invention the parts mounted on the outside and the inside of the casing are each automatically supplied with lubricant when the machine is in operation. Moreover, the various parts are supplied with lubricant in accordance with the amounts required by them. A lubricating pan, which is preferably mounted in the top part of the casing, is provided with selectively positioned drip openings in the bottom thereof. Each of the openings are made of a size predetermined in accordance with the lubricant to be supplied thereby. The gear wheels and bearings within the casing are supplied with lubricant directly from said drip openings in the pan. The gear wheels supported on the outside of the casing and the outside bearing have conduits for supplying them with lubricant from the openings in the bottom of the pan. The pan is supplied with lubricant by a pump which is connected to a resrvoir. The reservoir is located below the casing and the lubricant guards. The sides of the pan are made very low in order to permit any excess lubricant to overflow upon the parts contained within the casing.

The pump not only supplies lubricant to the pan but also supplies lubricant to the bearing for the work carrying spindle. The lubricant guard for the speed change gears drains the lubricant from the change gears and bearings into the lubricant guard for the index change gears. The guard for the index gears, the casing, and the bearing for the work carrying spindle are provided with means to drain lubricant directly into the reservoir. The reservoir is divided into compartments to permit the lubricant to settle in one compartment and overflow into another compartment which is connected to the pump. The hobbing machine disclosed is claimed and more fully disclosed in the companion application of William F. Zimmermann, Serial No. 4,207, filed January 23rd, 1925.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a plan view partially in section of a hobbing machine provided with a lubricating system constructed in accordance with our invention. Fig. 2 is an elevational view of the hobbing machine shown in Fig. 1. Fig. 3 is an end view partially in section of the machine shown in Fig. 1. Fig. 4 is a sectional view of the work carrying spindle. Fig. 5 is an elevational view of the indexing change gear wheels for the work carrying spindle. Fig. 6 is a sectional view of the index change gears shown in Fig. 6. Fig. 7 is an elevational view of the lubricant guard for the index change gears. Fig. 8 is a sectional view along the line 8—8 of Fig. 7. Fig. 9 is a sectional view along the line 9—9 of Fig. 8. Fig. 10 is a sectional view along the line 10—10 of Fig. 1.

Referring to the accompanying drawings, a gear hobbing machine is illustrated comprising a base 1 having an upright 2 mounted thereon. The upright 2 carries a cutter or hob 3ª on a spindle 3. The hob or cutter is not fully illustrated and the means for operating the hob carriage is not illustrated in detail inasmuch as our invention is not particularly related to such parts of the hobbing machine. A more complete description of such parts may be found in the above referred to application of William F. Zimmermann. A work carrying table 4 is mounted on a spindle 5. The spindle 5 is supported by a bushing 6 in a bearing support 7. The bearing support 7 is carried by the base 1 of the machine. Referring to Fig. 4 of the drawings, it will be noted lubricant grooves 8, which are spiral in form, are directly formed on the spindle 5 and lead from the top towards the bottom of the spindle. Near the top of the work carrying spindle 5 and adjacent to the work table 4, a washer 9 is provided having a number of holes 10 formed therein. The holes 10 are adapted to be connected to an opening 11 formed in a collar member 12 which is supported on the bushing support 7. The opening 11 is connected with a lubricant conductor 13. Near the lower end of the work carrying spindle is a circumferential groove 14 which connects with a lubricant drain 15.

At the rear of the base 1 is mounted a casing 16 which supports a main power shaft 17. A pulley 18, which is mounted on a main power shaft 17, is connected by a belt (not shown) to any suitable source of power. The main power shaft 17 supplies power for rotating the work carrying spindle 5, for rotating the hob spindle 3, and for feeding the hub with respect to the work table. Two cutter speed change gears 19 and 20 are provided between the main power shaft 17 and the cutter spindle for controlling the speed of such spindle. The gear wheel 19 is directly mounted on the main power shaft 17 and the gear wheel 20 is mounted on a short shaft 21. The shaft 21 is provided with a bearing 22 which is supported on the side of the casing 16, as shown in Fig. 1 of the drawings. A bevel gear wheel 23, which is mounted on the end of the shaft 21, meshes with a bevel gear wheel 24 which is mounted on a cutter-operating spline shaft 25. A bevel gear wheel 26, which has a spline connection with the shaft 25, is secured to move with a bracket 27 and meshes with a bevel gear wheel 28 on a cutter shaft 29. The cutter shaft 29 is carried by the upright 2 and has a spline connection with a worm member 30. The worm member 30 meshes with a worm wheel 31, which is carried by the cutter or hob spindle 3. A gear wheel 32, which is fixedly mounted on the end of the cutter spline shaft 25, as shown in Fig. 1 of the drawings, meshes with one section of a compound gear wheel 33. The compound gear wheel 33 comprises two sets of gear teeth 34 and 35, the set of gear teeth 34 meshing with the gear teeth on the gear wheel 32 and the set of gear teeth 35 meshing with the gear teeth on the gear wheel 36.

Referring to Figs. 5, and 6 of the drawings it will be noted the compound gear 33 is carried on a stud bolt 37 by means of a bushing 37ª. The bolt 37 is secured to an adjustable arm 38 which is supported on a shaft 46. A T bolt 39, which is secured to the end of the arm 38, is fitted to an arcuated T slot 40 in a block 41. The block 41 is secured to the side of the casing 16 and cooperates with the T bolt 39 for holding the arm 38 in any adjusted position. It is apparent the position of the arm 38 must be varied in accordance with the size of the compound gear which is mounted thereon. An axial hole 42 and two radial holes 43 and 44 are provided in the bolt 37 for supplying lubricant to the bearing surfaces between the bushing 37ª and the bolt. The means for supplying lubricant to the hole 44 in the bolt will be described hereinafter.

The gear wheel 36, which meshes with the compound gear wheel 33 is fixedly mounted on a table shaft 46. The shaft 46 carries a worm member 47 which meshes with a worm wheel 48 for effecting rotation of the work carrying spindle 5. The shaft 46 not only controls the rotation of the work carrying spindle 5 but also controls the feeding movement of the cutter or hob. A bevel gear wheel 50, which is mounted on the shaft 46 within the casing 16, meshes with a bevel gear wheel 51 on a short shaft 52. The shaft 52 carries a worm member 53 which meshes with a worm wheel 54 on a shaft 55. The shaft 55 carries a gear wheel 56 which meshes with a gear wheel 57 on a shaft 58. The two gear wheels 56 and 57 comprise the feed change gears, which are varied in accordance with the feed desired. The shaft 58 is connected to the feed shaft 59 by means of two bevel gear wheels 60 and 61. Inasmuch as my invention is not particularly related to the feeding movement a further description of the feeding mechanism is deemed unnecessary.

Referring to Figs. 1 and 3 of the drawings it will be noted two bevel gear wheels 63, one only of which is clearly shown, are disposed on opposite sides of a clutch mechanism 64 on the shaft 58. The bevel gear wheels 63 mesh with a bevel gear wheel 65 which is mounted on a shaft 66. Such bevel gear wheels 63 and 65 and the clutch mechanism 64 comprise a part of a rapid traverse mechanism which is provided for rapidly moving the cutter towards and away from the work. The bevel gear wheels and the clutch mechanism are located within the casing 16 and the shaft 66 is provided with a bearing 67 on the casing. A gear wheel 68, which is fixedly mounted on the shaft 66, meshes with a gear wheel 69 on the main power shaft 17.

Near the top of the casing 16 is located a lubricant pan 70. The lubricant pan is provided with a number of drip openings 71 in the bottom thereof which serve to lubricate not only the bearings and gear wheels contained within the casing 16 but also to lubricate the gear wheels which are mounted on the outside of the casing. The pan is supported in the casing 16 by means of brackets 72, as shown in Fig. 1 of the drawings, and the sides thereof are made very low in order to permit an overflow of any excess lubricant upon the parts contained within the casing 16.

The cutter speed change gears 19 and 20 are supplied with lubricant by means of a conductor 74 which is supplied with lubricant by a drip opening 75 in the pan 70, as shown in Figs. 1 and 3 of the drawings. The bearing 22 for the shaft 21 is supplied with lubricant by a conductor 76 which receives lubricant from a drip opening 77 in the bottom of the pan 70. Drip openings 78 and 79 are respectively provided for supplying lubricant to the bearings of the main shaft 17 and the shaft 66. The other openings 71 in the bottom of the pan are selectively placed in order to lubricate various other gear wheels and bearings. The size of the openings are varied in accordance with the amount of lubricant to be supplied to the associated bearing or gear wheels. The opening 80 in the bottom of the pan supplies lubricant to a conductor 81 having a perforated tube 82 connected to the end thereof as best shown in Figs. 1, 5 and 6 of the drawings. The perforated tube is located above the opening 44 in the bolt 37. The length of the tube 82 is so determined as to always supply lubricant to the bearing surface between the bushing 37ª and the bolt 37 irrespective of the angular position of the arm 38. Moreover the perforated tube supplies lubricant to the index change gears comprising gear wheels 32, 36 and 33. The index change gears in turn splash lubricant upon the feed change gears 56 and 57.

The pan 70 is supplied with lubricant by means of a pump 84 which is operated directly from the main power shaft 17. A gear wheel 85, which is mounted on the power shaft 17, meshes with a gear wheel 86 which is connected to the pump 84. By so connecting the pump it is apparent the flow of lubricant in the system is stopped whenever the main power shaft is out of operation. An inlet opening 87 of the pump 84 is connected by a conductor 88 to a reservoir 89. The reservoir 89 is located below the casing 16 and is divided into two compartments by means of a wall 90, as shown in Figs. 2 and 3 of the drawings. The compartment 91 receives the lubricant, which is drained away from the various bearings and gear wheels and the compartment 92 receives the overflow lubricant which has settled in the compartment 91. The conductor 88, which is connected to the inlet opening of the pump, is supplied with lubricant from the compartment 92 through a strainer 93. The outlet opening of the pump is connected to a conductor 94, which is divided into two branches, one branch 95 supplies lubricant to the pan 70 and the other branch 96 supplies lubricant to the conductor 13 which is connected to the bearing for the work carrying spindle 5.

The cutter speed change gears 19 and 20 are enclosed by means of a lubricant guard 97, which is attached to the side of casing 16. The guard 97 is provided with a door 98, which is so constructed and attached to the guard as to prevent leakage of lubricant and at the same time to permit free access to the speed change gears. In the sectional view shown in Fig. 10 of the drawings the construction and arrangement of the flashing plates are illustrated for preventing leaking of lubricant. Near the bottom of the door is shown a plate 99 which directs lubricant against a plate 100 and from there to the bottom of the lubricant guard. A slotted link 101, which is attached to the door, is connected to a pin in a bracket 102 in order to limit the opening of the door. The lubricant, which is collected in the guard 97, is conveyed by a conductor 104 to a guard member 105, as shown in Figs. 1 and 3 of the drawings.

The guard member 105 is secured to the side of the casing 16 and enclose not only the index change gears but also the feed change gears. A door 106, which is illustrated in Figs. 1, 7, 8 and 9 of the drawings, is provided for permitting access to the two sets of change gears. The door 106 is so constructed with flashing plates as to insure against any loss of lubricant either when the door is open or closed. A plate 107, which is attached to the lower part of the door, as shown in Fig. 8 of the drawings, serves to direct any lubricant, which is collected by the door, against a plate 108 which is mounted on the body portion of the guard 105. By means of said plates 107 and 108 it is apparent lubricant is prevented from escaping at the point where the door is hinged to the guard. A link 109, which is shown in Fig. 8 of the drawings, is provided for limiting the opening of the door 106. The lubricant, which is collected in the lubricant guard 105 and which is drained into it from the guard 97, is drained by a conductor 110 into a third compartment 111 which is formed in the top portion of the reservoir 89. The compartment 111 conveys the lubricant received from the guard member 105 into the settling compartment 91 of the reservoir.

A conductor 112 is provided for draining the lubricant collected in the bottom of the casing directly into the settling compartment 91 of the reservoir. A conductor 113 is provided for draining lubricant from the bearing for the work carrying spindle into the conductor 112 which, as above set forth, is connected to the reservoir.

In the above described lubricating system the pump supplies lubricant directly from the reservoir 89 to the distributing pan 70 and to the bearing for the work carrying spindle 5. The pan is provided with drip openings which are selectively placed to distribute lubricant to the various gear wheels and bearings not only located within the casing 16 but also mounted on the outside of the casing. The change gears and bearings located outside the casing are enclosed by guard members in order to protect them from dirt and to collect and drain away the lubricant which is supplied to them. The lubricant, which is supplied to the gear wheels and bearings and to the work carrying spindle, is drained into a settling compartment of the reservoir.

A second compartment 92 which receives the overflow lubricant from the settling compartment is connected to the pump for supplying lubricant to the pan and the bearing for the work carrying spindle.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents, thereof, by Letters Patent of the United States:—

1. In a normally stationary machine tool having a main casing with operating mechanism and bearings located at various horizontally spaced points therein; a shallow horizontally arranged pan removably mounted in said casing and overlying said operating mechanism and bearings; outlets in the bottom of said pan selectively located to supply lubricant at desired points; a reservoir located below said operating mechanism and bearings; and a pump for supplying lubricant from said reservoir to said pan in excess amounts whereby the pan is kept full to maintain an even constant head on the outlets and excess lubricant overflows the shallow pan to the parts to be lubricated.

2. In a machine, the combination comprising a casing; a plurality of gear wheels; a removable lubricant pan located in and near the top of said casing and having selectively placed drip openings in the bottom thereof for supplying lubricant to said gear wheels and the bearings therefor, said openings being varied in size according to the lubricant to be supplied; a reservoir located below said casing for draining the lubricant supplied to the gear wheels and bearings, said reservoir having a compartment for permitting the settling out of foreign matter contained in the collected lubricant; and a pump for supplying lubricant from said reservoir to the pan.

3. A lubricating system for normally stationary machine tools having horizontally separated bearing parts and operating mechanism requiring lubrication, comprising a substantially flat bottomed removable pan overlying said bearing parts and mechanism; means for supplying lubricant to said pan; and ports in the bottom of said pan located over the points requiring lubrication.

4. In a machine, the combination comprising a plurality of gear wheels and bearings therefor; an independent lubricant pan supported above said gear wheels and bearings and having openings in the bottom thereof for supplying lubricant to the gear wheels and bearings, each of said openings being of a size determined according to the lubricant to be supplied and the sides of the pan being low to permit any excess lubricant to overflow on the parts to be lubricated; and means for continuously supplying said pan with lubricant.

5. A lubricating system for normally stationary machine tools having a casing and horizontally spaced operating and bearing parts therein requiring lubrication, comprising a horizontally arranged substantially flat bottomed shallow pan removably mounted in said casing and overlying said parts; a reservoir located below said parts; a pump and connections for supplying lubricant from said reservoir to said pan; outlets in said pan selectively spaced in accordance with the points to be lubricated and varying in size according to the relative amounts desired to be supplied, said pump being adapted to supply lubricant in excess amounts whereby the pan is maintained full and the excess overflows to the parts to be lubricated.

6. In a machine, the combination comprising a plurality of gear wheels and bearings; a main power shaft for operating said gear wheels; a lubricant pan independently supported above said gear wheels and bearings and having openings selectively placed in the bottom thereof for supplying lubricant to the gear wheels and bearings, the sides of said pan being low to permit any excess lubricant to overflow on the parts to be lubricated; a reservoir located below said gear wheels and bearings; and a pump operated by said main power shaft for supplying lubricant from said reservoir to the pan.

7. In a machine, the combination comprising a plurality of gear wheels and bearings; a removable shallow lubricant pan supported above said gear wheels and bearings, said pan having openings selectively placed in the bottom thereof for supplying lubricant to said gear wheels and bearings; a reservoir located below said gear wheels and bearings; and a pump operated only when the gear wheels are in operation for supplying lubricant from said reservoir to the pan.

8. In a machine, the combination comprising a plurality of gear wheels and bearings; a detachable lubricant pan independently supported above said gear wheels and bearings, said pan having openings in the bottom thereof for supplying lubricant to the gear wheels and bearings; a reservoir divided into compartments and located below said gear wheels and bearings, the lubricant being collected from the gear wheels and bearings to settle in one compartment and overflow into a second compartment; and a pump for supplying lubricant from the second compartment to the pan.

9. In a machine, the combination comprising a casing; a plurality of meshing gear wheels mounted externally of said casing; a stud bolt for rotatably supporting one of said gear wheels; a pivotally mounted arm for supporting said bolt; a pan within said casing; and a perforated tube located adjacent to said gear wheels for supplying lubricant from said pan to the bearing for the gear wheel on said bolt, said tube serving to supply lubricant to said bearing irrespective of the rotative position of the arm carrying said bolt.

10. In a machine, the combination comprising a casing; a compound gear wheel external of said casing; a stud bolt for rotatably supporting said compound gear wheel; a plurality of auxiliary gear wheels meshing with said compound gear wheel; a pivotally mounted arm for supporting said bolt and adjustable to mesh compound gear wheels of different sizes with said auxiliary gear wheels; a pan within said casing; and a perforated tube carrying lubricant and extending from said pan through a wall of said casing and terminating adjacent to said compound gear wheel for supplying lubricant to the bearing therefor, said tube serving to supply lubricant to the compound gear bearing through the entire range of movement of said arm.

11. In a machine, the combination comprising a compound gear wheel; a stud bolt having a bushing for rotatably supporting said compound gear wheel; two auxiliary gear wheels meshing with said compound gear; a pivotally mounted arm for supporting said bolt; and a perforated tube carrying lubricant and located adjacent to said compound gear wheel for supplying lubricant to said bushing, said tube serving to supply lubricant to said bushing through the entire range of movement of the arm.

12. In a machine, the combination comprising a compound gear wheel; auxiliary gear wheels meshing with said compound gear wheel; means for adjusting said compound gear wheel through a limited range of movement to mesh with said auxiliary gear wheels; and a tube carrying lubricant and located adjacent to said compound gear wheel, said tube serving to supply lubricant to the bearing for the compound gear wheel through the entire range of its movement of adjustment.

13. In a hobbing machine having a work spindle, a hob spindle, change gears for indexing the work spindle and change gears for varying the speed of the hob spindle, the combination comprising a casing; a lubricant pan detachably located in said casing having openings in the bottom thereof for supplying lubricant to said index change gears and to said hob change gears; and means for supplying lubricant to said pan and to the bearing for said work spindle.

14. In a hobbing machine having a work spindle, a hob spindle, change gears for indexing the work spindle, and change gears for varying the speed of the hob spindle, the combination comprising a lubricant pan having one opening in the bottom thereof for supplying lubricant to a bearing for said index gears; openings in the bottom of said pan for supplying lubricant to the hob change gears and to a bearing therefor; a reservoir for collecting the lubricant used in the machine; a pump for supplying lubricant from said reservoir to the pan; and a branch line from said pump for supplying lubricant to the bearing for the work spindle.

15. In a hobbing machine having a work spindle, a hob spindle, change gears for indexing the work spindle, and change gears for varying the speed of the hob spindle, the combination comprising a reservoir of lubricant; a lubricant pan having selectively placed openings in the bottom thereof for supplying lubricant to change gears and bearing on the machine; a pump for supplying lubricant from said reservoir to the pan; a connection from said pump for supplying lubricant to the bearing for the work spindle; and means for draining lubricant from the work spindle bearing and from the various gears and bearings into said reservoir.

16. In a hobbing machine having a work spindle and a hob spindle, the combination comprising a casing; a lubricant pan located in the upper part of said casing and having openings in the bottom thereof; change gears for indexing the work spindle, said change gears being mounted on and outside said casing; speed change gears for operating the hob spindle, said speed change gears being mounted on and outside said casing; a connection for supplying lubricant received from one of the openings in the pan to a bearing for said index change gears; connections for supplying lubricant from openings in said pan to the speed change gears and to a bearing for the speed change gears; a reservoir located below said pan; a pump for supplying lubricant from said reservoir to the pan; and return connections for draining the lubricant into the reservoir which has been supplied by said pan.

17. In a hobbing machine having a work spindle and a hob spindle, the combination comprising a casing having operating gearing mounted therein and shafts having bearings supported thereon; change gears supported on and outside of said casing for indexing said work spindle; a lubricating guard surrounding said indexing gears and secured to said casing; speed change gears for operating said hob spindle, said change gears being supported on and outside of said casing; a lubricating guard enclosing said speed gears and secured to the casing; a lubricant pan mounted in the upper part of said casing and having selectively placed drip openings in the bottom thereof; drip branch conductors for supplying lubricant from the openings in said pan to the index gears, an index gear bearing, a speed gear bearing, and the speed gears; and means for supplying lubricant to the pan.

18. In a hobbing machine having a work spindle and a hob spindle, the combination comprising a casing having operating gearing mounted therein; change gears for indexing said work spindle and feed change gears, each set of change gears being supported on and outside of said casing; a lubricant guard enclosing said sets of change gears; a lubricant pan mounted in the upper part of said casing and having selectively placed drip openings in the bottom thereof, certain of said openings serving to supply lubricant to the gearing in said casing; a drip branch conductor for supplying lubricant from the pan to the two sets of change gears; a reservoir located below said casing; a pump for supplying lubricant from said reservoir to the pan; and conductors for draining lubricant from said lubricant guard and the casing into said reservoir.

19. In a hobbing machine having a work spindle and a hob spindle, the combination comprising a casing having operating gearing mounted therein; change gears for indexing said work spindle, said change gears being mounted on and outside of said casing; a lubricant guard for enclosing said index gears and secured to said casing; a lubricant guard for enclosing said indexing gears and secured to said casing; a lubricant pan mounted in the upper part of said casing and having selectively placed drip openings in the bottom thereof, certain of said openings supplying lubricant to the gearing in said casing; and means for supplying lubricant to the pan.

20. In a hobbing machine having a work spindle and a hob spindle, the combination comprising a casing having gearing mounted therein; feed change gears mounted on and outside of said casing; a lubricant guard for enclosing said feed gears, said guard having a door for access to said gears and constructed to prevent lubricant leakage; a lubricant pan mounted in the upper part of said casing and having selectively placed drip openings in the bottom thereof, certain of said openings supplying lubricant to the gearing in said casing; and means for supplying lubricant to the pan.

21. In a hobbing machine having a work spindle and a hob spindle, the combination comprising a casing having gearing mounted therein; speed change gears for operating said hob spindle, said speed gears being mounted on and outside of said casing; a lubricant guard for enclosing said speed gears, said guard having a door for access to said speed gears and constructed to prevent lubricant leakage; a lubricant pan mounted in the upper part of said casing and having selectively placed drip openings in the bottom thereof, certain of said openings supplying lubricant to the gearing in said casing; a reservoir located below said casing; a pump for supplying lubricant from said reservoir to the pan; a drip conductor for suplying lubricant from said pan to said speed gears; and means for draining lubricant from said guard and from said casing into said reservoir.

In witness whereof, we have hereunto subscribed our names.

WILLIAM F. ZIMMERMANN.
HUGO W. JACOBSON.